(12) United States Patent
Tanaka (10) Patent No.: US 6,611,386 B2
(45) Date of Patent: Aug. 26, 2003

(54) THREE-GROUP ZOOM LENS (75) Inventor: Takashi Tanaka, Kawagoe (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 28 days.

(21) Appl. No.: 09/793,519

(22) Filed: Feb. 27, 2001

(65) Prior Publication Data

US 2001/0022694 A1 Sep. 20, 2001

(30) Foreign Application Priority Data

Feb. 28, 2000 (JP) ........................................ 2000-051304

(51) Int. Cl.[7] .............................................. G02B 15/14
(52) U.S. Cl. ........................ 359/689; 359/680; 359/684
(58) Field of Search .......................... 359/689, 680–682, 359/687, 683–685

(56) References Cited

U.S. PATENT DOCUMENTS

| | | | | |
|---|---|---|---|---|
| 6,243,213 B1 | * | 6/2001 | Mori ........................... | 359/681 |
| 6,308,011 B1 | * | 10/2001 | Wachi et al. .................. | 396/72 |
| 6,417,973 B2 | * | 7/2002 | Mihara et al. ............... | 359/684 |
| 6,498,687 B1 | * | 12/2002 | Sekita et al. ................. | 359/680 |

FOREIGN PATENT DOCUMENTS

JP           59-31922        2/1984

* cited by examiner

*Primary Examiner*—Jordan M. Schwartz
(74) *Attorney, Agent, or Firm*—Arnold International; Bruce Y. Arnold (57) ABSTRACT

A three-group zoom lens is provided of negative, positive, and positive refractive power, respectively, in the order from the object side. The first lens group is formed of a negative lens element and a positive lens element, the second lens group includes a stop for controlling the brightness of an image, two positive lens elements, and a negative lens element, and each lens group includes at least one aspherical surface. When zooming from the wide-angle end to the telephoto end, the first lens group is moved nearer the second lens group, and said second and third lens groups are moved continuously toward the object side. When focusing from an object at infinity to an object nearby, the third lens group is moved toward the object side. Specified conditions are satisfied in order to ensure that the exit pupil is an appropriate distance from the image plane for efficient light detection, while providing a zoom lens having an $F_{NO}$ of approximately 2.8 or less and a zoom ratio of 2.5 or more in a compact design that provides high-speed focusing and favorably corrects for aberrations, including chromatic aberrations.

11 Claims, 3 Drawing Sheets

FIG. 1

Spherical Aberration (mm)
FIG. 2A

Astigmatism (mm)
FIG. 2B

Distortion (%)
FIG. 2C

Spherical Aberration (mm)
FIG. 2D

Astigmatism (mm)
FIG. 2E

Distortion (%)
FIG. 2F

Spherical Aberration (mm)
FIG. 3A

Astigmatism (mm)
FIG. 3B

Distortion (%)
FIG. 3C

Spherical Aberration (mm)
FIG. 3D

Astigmatism (mm)
FIG. 3E

Distortion (%)
FIG. 3F

THREE-GROUP ZOOM LENS

BACKGROUND OF THE INVENTION

Three-group zoom lenses are extensively used for various types of cameras due to their enabling the camera to be compact while favorably correcting aberrations. For digital cameras and video cameras, which are rapidly coming into widespread use, particular requirements such as compactness, high quality images, and low distortion are required of a zoom lens due to the use of a solid-state image detection surface (e.g., a CCD array) that is smaller than film sizes used with conventional cameras.

Digital cameras and video cameras primarily use an automatic focusing system, and high-speed automatic focusing is desired. Among zoom lens focusing systems, inner focusing and rear focusing systems are often used because they move lens elements of less mass and are easier to operate due to the lens elements that are moved being nearer the camera body. The present inventor previously disclosed a three-group zoom lens in Japanese Laid Open Patent Application No. H10-293253. The most remarkable feature of the system described in this publication is that the exit pupil is sufficiently distant from the image plane for efficient detection of the light by a CCD detector array. Unlike photographic film, which can detect light that is incident the image plane at nearly any angle, solid-state image detection elements of a conventional CCD array can efficiently detect only the light that is incident the image plane at nearly a right angle. Therefore, one of the optical requirements for imaging an object onto such a CCD array is to ensure that the light is incident at nearly a right angle, regardless of the image height. In other words, one must ensure that the exit pupil is sufficiently distant from the image plane.

Recently, however, CCD arrays have been developed that can receive light most efficiently when the exit pupil is located at a distance, on the object side of the image plane, that is about 5 times the maximum image size (where the maximum image size equals two times the maximum image height). These CCD arrays are actually less efficient in detecting light when the exit pupil is positioned farther away from the image plane. This is disadvantageous for those zoom lenses in which the third lens group is stationary or barely moved during magnification change, as occurs for the zoom lens described in Japanese Laid Open Patent Application No. H10-293253.

On the other hand, a conventional three-group, rear-focus zoom lens is described in Japanese Laid Open Patent Application No. 59-31922. This zoom lens keeps the distance between the second and third lens groups constant during magnification change when the object being focused upon is at a very near distance. However, the exit pupil often comes too close to the, image plane at the wide-angle end for efficient detection of the light. An attempt to keep them apart to a certain degree causes the distance between the second and third lens groups to widen at the wide-angle end when the zoom lens is in focus at infinity, failing to meet a compactness requirement for the zoom lens.

The present inventor's three-group zoom lens as described in Japanese Laid Open Patent Application No. H11-90762 can change magnification while keeping the distance between the second and third lens groups sufficient. This zoom lens uses only a six lens element configuration by using aspherical surfaces at several predetermined positions, and favorably corrects for aberrations while realizing compactness. In the future CCD arrays to be used with electronic still cameras are expected to have an enormously increased number of pixels. Currently, CCD arrays having more than 300 million pixels have been developed. Accordingly, there is market demand for an increasingly higher resolution of photographic lenses designed for mounting in electronic still cameras. In addition to the requirement for higher resolution, there is also a need for the zoom lens to have a bright image, which imposes a requirement that the F number of the zoom lens be approximately 2.8 or lower. Ensuring sufficient peripheral light to obtain such a bright image generally causes increased chromatic aberration. Since the market now demands high quality, color photographs, it is necessary to provide a bright zoom lens which favorably corrects for chromatic aberration.

BRIEF SUMMARY OF THE INVENTION

The present invention is a three-group zoom lens, especially one for use in digital cameras and video cameras that employ a solid state, image-detecting array. The first object of the invention is to provide a three-group zoom lens having a zoom ratio of 2.5 or more, high-speed focusing, and an exit pupil that is an appropriate distance for newly available CCD detector arrays, namely, with the overall length between the object-side surface of the first lens group to the image plane being less than 6 times the maximum image size (again, where the maximum image size equals two times the maximum image height). A second object of the invention is to provide a zoom lens having an $F_{NO}$ of approximately 2.8 so as to provide a bright image, and which favorably corrects for aberrations, including chromatic aberration, over the entire range of zoom.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

The three-group zoom lens of the present invention is formed of, in order from the object side, a first lens group having negative refractive power, a second lens group having positive refractive power, and a third lens group having positive refractive power. The second lens group includes a stop for adjusting the amount of light that is incident onto the image plane. When zooming from the wide-angle end to the telephoto end, the first lens group is moved nearer the second lens group, and the second and third lens groups are moved continuously toward the object side. When changing the focus from infinity to a nearby object, the third lens group is moved toward the object side. The first lens group is formed of a negative lens element and a positive lens element. The second lens group is formed of two positive lens elements and a negative lens element. Each of the three lens groups includes at least one aspherical surface, and the distance between the second lens group and the third lens groups is nearly constant during zooming when the zoom lens is focused at an object at infinity. Further, the following Conditions (1)–(5) are satisfied:

$$0.3 < f_W/|f_1| < 0.6 \quad \text{Condition (1)}$$

$$1.1 < f_T/|f_1| < 1.6 \quad \text{Condition (2)}$$

$$0.4 < f_2/f_3 < 0.8 \quad \text{Condition (3)}$$

$$0.15 < D_{2W}/f_3 < 0.3 \quad \text{Condition (4)}$$

$$\nu_{2P} > 68 \quad \text{Condition (5)}$$

where $f_W$ is the focal length of the zoom lens at the wide-angle end, $f_1$ is the focal length of the first lens group, in order from the object side, $f_T$ is the focal length of the zoom lens at the telephoto end, $f_2$ is the focal length of the second lens group, in order from the object side, $f_3$ is the focal length of the third lens group, in order from the object side, $D_{2W}$ is the distance, at the wide-angle end when the zoom lens is focused on an object at infinity, between the surface of the second lens group that is nearest the image and the surface of the third lens group that is nearest the object, and $\nu_{2P}$ is the average of Abbe numbers of the positive lens elements in the second lens group.

As an example of a three-group zoom lens described above, the first lens group may be formed of, in order from the object side, (1) a negative lens element having surfaces of different radii of curvature, with the surface of smaller radius of curvature being concave and on the image side, and (2) a positive meniscus lens element with its convex surface on the object side. The second lens group may be formed of the following three lens elements, in order from the object side: (1) a biconvex lens element; (2) a positive lens element having surfaces of different radii of curvature, with the surface of smaller radius of curvature being convex and on the object side, and (3) a negative lens element having surfaces of different radii of curvature, with the surface of smaller radius of curvature being concave and on the image side. The third lens group may be formed of a positive lens element having surfaces of different radii of curvature, with the surface of smaller radius of curvature being convex and on the object side. Preferably, the negative lens element in the first lens group and at least one of the positive lens elements in the second lens group each include aspherical surfaces, a stop is positioned in the second lens group nearest to the object side, and the following Conditions (6)–(8) are satisfied:

$$N_{1n} > 1.72 \quad \text{Condition (6)}$$

$$\nu_{1n} - \nu_{1p} > 11 \quad \text{Condition (7)}$$

$$2.5 < (R_4 + R_3)/(R_4 - R_3) < 6 \quad \text{Condition (8)}$$

where $N_{1n}$ is the refractive index of the negative lens element in the first lens group, $\nu_{1n}$ is the Abbe number of the negative lens element in the first lens group, $\nu_{1p}$ is the Abbe number of the positive lens element in the first lens group, $R_3$ is the radius of curvature of the object-side surface of the positive lens element in the first lens group, and $R_4$ is the radius of curvature of the image-side surface of the positive lens element in the first lens group.

The three-group zoom lens according to the present invention allows the incorporation of a rear-focusing system with the exit pupil being appropriately distant from the image plane because, when the zoom lens is in focus at infinity, the distance between the second and third lens groups is nearly fixed during zooming. In addition, the three-group zoom lens according to the present invention ensures compactness and favorable correction of aberrations due to the first lens group being formed of a negative lens element and a positive lens element and due to each lens group including at least one aspherical surface. Further, since all of the lens groups are movable, it is relatively easy in the present invention to add a body pull-back mechanism in order to further shorten the overall length of the lens.

Condition (1) defines the image magnification of the combination of the second and third lens groups at the wide-angle end, and Condition (2) defines the image magnification of the combination of the second and third lens groups at the telephoto end. Both of these conditions are to maintain a balance between compactness and aberration correction while keeping an appropriate zoom ratio. When Condition (1) does not satisfy the lower limit, the overall length of the zoom lens will become too large at the wide-angle end. Also, the back focal length at the wide-angle end will become too short to allow space for inserting a low pass filter between the third lens group and the image plane. When Condition (1) does not satisfy the upper limit, the refractive power of the first lens group will be excessive and make it difficult to favorably correct aberrations using only two lens elements in the first lens group.

When Condition (2) fails to satisfy the lower limit, the movement amount of the first lens group will be excessive in order to obtain a zoom ratio of 2.5 or more. Thus, the overall length of the zoom lens will be excessive. When Condition (2) fails to satisfy the upper limit, the first lens group will have excessive magnification. This demands excessive precision in assembling the optical system.

Condition (3) ensures a proper distribution of refractive power between the second and third lens groups. When Condition (3) fails to satisfy the lower limit, the third lens group will have too small a refractive power and will need to be moved a prolonged distance for focusing. As a result, focusing will cause significant peripheral image variation. On the other hand, when Condition (3) exceeds the upper limit, the third lens group will have excessive refractive power and it will become difficult to favorably correct for aberrations using only a single lens element in the third lens group.

Condition (4) defines the ratio of the distance between the second and third lens groups divided by the focal length of the third lens group. When the lower limit of Condition (4) is not satisfied, sufficient travel distance for focusing will be no longer available so that the nearest an object can be imaged at the telephoto end will become too far. On the other hand, when the upper limit of Condition (4) is not satisfied, the distance between the second and third lens groups will become too large, causing the required diameters of the lens elements of the third lens group to be too large for a compact design.

Condition (5) defines the average of the Abbe numbers of the positive lens elements of the second lens group in order that low dispersion optical material may be used for at least one of these two positive lens elements. This enables favorable correction of chromatic aberration of the zoom lens even though the zoom lens has an $F_{NO}$ as low as approximately 2.8.

In general, when the ambient temperature rises, lens holder frames expand along the direction of the optical axis and the focal point shifts towards the object side. Therefore, temperature rise causes an out-of-focus condition. However, the three-group zoom lens according to the present invention can correct this by using a low dispersion optical material for the positive lens element of the second lens group. Unlike general glass material, low-dispersion optical material has a refractive index that decreases with increasing temperature, thus enabling the focal point to be shifted toward the image detection surface in order to correct an out-of-focus condition of the zoom lens. Further, low dispersion optical material has a low melting point and is easy to mold in order to form an aspherical surface.

Condition (6) defines the refractive index of the negative lens element in the first lens group. When the Condition (6) fails to satisfy the lower limit, the negative lens element will have a larger surface curvature. This makes it difficult to correct astigmatism and distortion aberrations at the wide-angle end, even though aspherical surfaces are incorporated.

Condition (7) defines the difference in the Abbe numbers of the negative and positive lens elements in the first lens group. When the lower limit of Condition (7) is not satisfied, it will be difficult to satisfactorily suppress lateral color at the wide-angle end and axial chromatic aberration fluctuations during zooming.

Condition (8) defines the so-called "shape factor" for the positive meniscus lens element in the first lens group. When Condition (8) is not within the stated bounds, it becomes excessively difficult to correct astigmatism at the wide-angle end using only two lens elements in the first lens group.

Two embodiments of the present invention will now be described with reference to the drawings.

Embodiment 1

Figure 1:
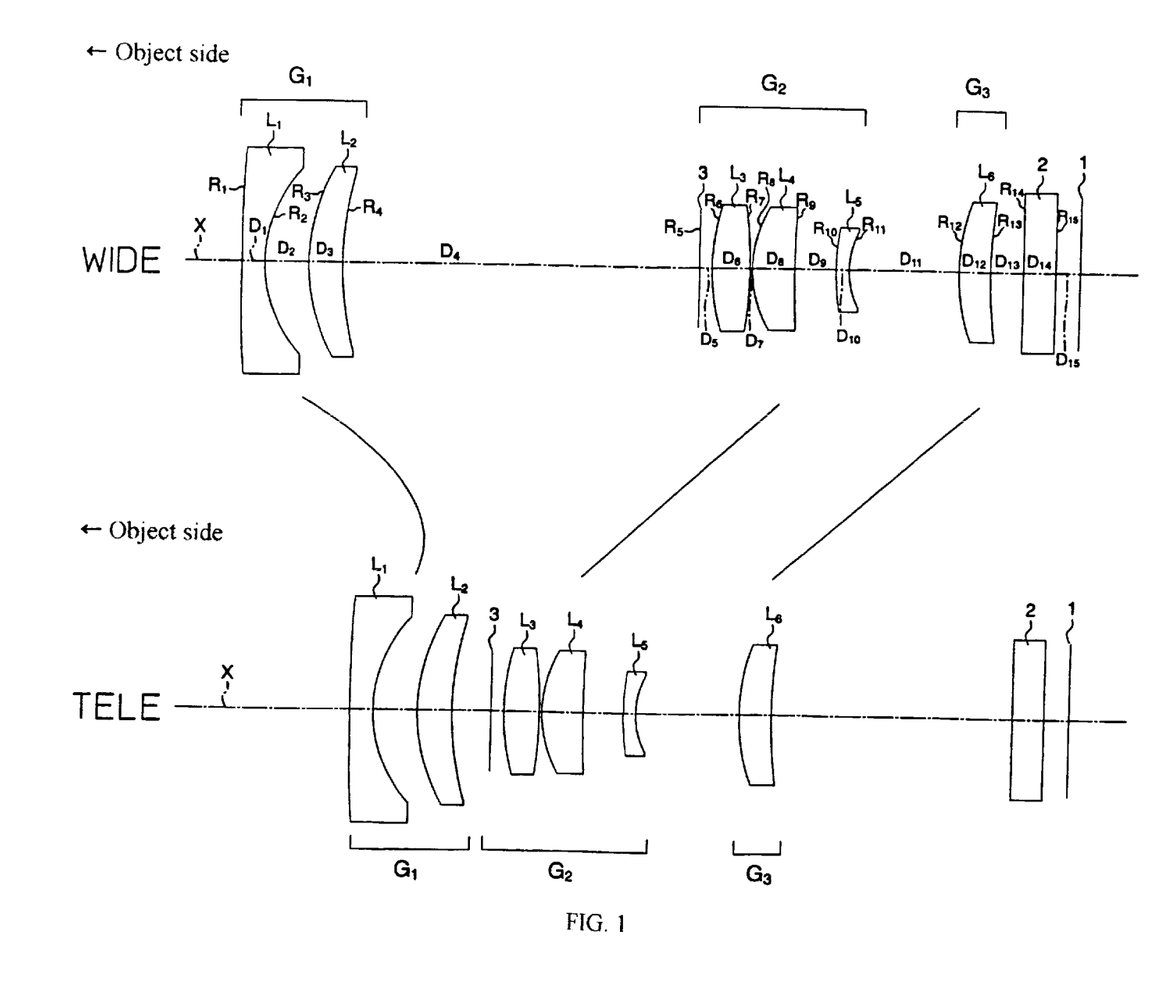
FIG. 1 shows the basic lens element configuration of both Embodiments of the present invention.

FIG. 1 shows the basic lens element configuration and lens group positions at the wide-angle end (WIDE) and telephoto end (TELE) of the three-group zoom lens of Embodiment 1. The three group lens of this embodiment includes, in order from the object side, a first lens group $G_1$ having negative refractive power, a second lens group $G_2$ having positive refractive power, and a third lens group $G_3$ having positive refractive power. The first and second lens groups are movable for zooming. The third lens group $G_3$ is moved toward the object when focusing from infinity to a nearby distance. Thus the focal length f of the zoom lens is varied and light flux from an object is efficiently focused onto an image plane 1 by moving the three lens groups $G_1$, $G_2$, and $G_3$ along the optical axis X.

In the zoom lens of this embodiment, the first lens group $G_1$ is formed of, in order from the object side, a first lens element $L_1$ that is a negative meniscus lens with its concave surface on the image side, and a second lens element $L_2$ that is a positive meniscus lens with its convex surface on the object side. The second lens group $G_2$ is formed of, in order from the object side, a stop 3, a third lens element $L_3$ that is a biconvex lens having surfaces of different radii of curvature and with the surface of smaller radius of curvature on the object side, a fourth lens element $L_4$ that is a positive meniscus lens with its convex surface on the object side, and a fifth lens element $L_5$ that is a negative meniscus lens with its concave surface on the image side. The third lens group $G_3$ is formed of a sixth lens element $L_6$ that is a positive meniscus lens with its convex surface on the object side. A cover glass element 2 that includes a low pass filter and infrared-blocking filter is positioned between the sixth lens element $L_6$ and the image plane 1 (i.e., the CCD array surface).

As is shown by the lens movement traces in FIG. 1, the distance between the second and third lens groups $G_2$ and $G_3$ is nearly constant during magnification change when the zoom lens is focused at infinity.

Table 1 below lists the surface number #, in order from the object side, the radius of curvature R (in mm) of each surface near the optical axis, the on-axis surface spacing D (in mm), as well as the refractive index $N_d$ and the Abbe number $\nu_d$ (at the d line) of each lens element for this embodiment. The bottom portion of Table 1 lists the range of the focal length, the range of the $F_{NO}$, and the picture angle 2ω for this embodiment.

TABLE 1

| # | R | D | $N_d$ | $\nu_d$ |
|---|---|---|---|---|
| 1* | 255.812 | 1.50 | 1.80610 | 40.7 |
| 2 | 8.466 | 2.78 | | |
| 3 | 11.891 | 2.12 | 1.84665 | 23.8 |
| 4 | 20.532 | D4 (variable) | | |
| 5 | ∞ (stop) | 0.80 | | |
| 6 | 13.892 | 2.31 | 1.48749 | 70.2 |
| 7 | −29.094 | 0.15 | | |
| 8* | 7.485 | 2.64 | 1.49700 | 81.6 |
| 9* | 110.925 | 2.54 | | |
| 10 | 15.877 | 0.80 | 1.84665 | 23.8 |
| 11 | 5.132 | D11 (variable) | | |
| 12* | 12.960 | 1.98 | 1.68893 | 31.1 |
| 13 | 32.723 | D13 (variable) | | |
| 14 | ∞ | 2.00 | 1.51680 | 64.2 |
| 15 | ∞ | | | |
| f = 8.71–24.39 | | $F_{NO}$ = 2.89–4.57 | | 2ω = 61.2°–22.6° |

Those surfaces with a * to the right of the surface number in Table 1 are aspherical surfaces, and the aspherical surface shape is expressed by Equation (A) below.

$$Z = CY^2/\{1+(1-(1+K)C^2Y^2)^{1/2}\} + A_4Y^4 + A_6Y^6 + A_8Y^8 + A_{10}Y^{10} \quad \text{(Equation A)}$$

where

Z is the length (in mm) of a line drawn from a point on the aspherical surface at a distance Y from the optical axis to the tangential plane of the aspherical surface vertex, C(=1/R) is the curvature of the aspherical surface near the optical axis, Y is the distance (in mm) from the optical axis, K is the eccentricity, and $A_4$, $A_6$, $A_8$, and $A_{10}$ are the 4th, 6th, 8th, and 10th aspherical coefficients.

Table 2 below lists the values of the variables D4, D11 and D13 (i.e, the group spacings) at both the wide-angle end (WIDE) to the telephoto end (TELE) when focused for an object at infinity and nearby. The term "nearby object" refers to an object that is 0.2 m from the image plane 1.

TABLE 2

| | Object at Infinity | | Nearby Object | |
|---|---|---|---|---|
| | WIDE | TELE | WIDE | TELE |
| D4 | 22.46 | 2.38 | 22.46 | 2.38 |
| D11 | 6.93 | 6.93 | 6.07 | 3.56 |
| D13 | 2.00 | 14.63 | 2.85 | 17.99 |

Table 3 below lists the values of the constants K, $A_4$, $A_6$, $A_8$, and $A_{10}$ used in Equation (A) above for each of the aspherical surfaces indicated in Table 1.

TABLE 3

| # | K | $A_4$ | $A_6$ | $A_8$ | $A_{10}$ |
|---|---|---|---|---|---|
| 1 | 0.00000 | $6.00811 \times 10^{-5}$ | $-6.72477 \times 10^{-7}$ | $1.71088 \times 10^{-8}$ | $-1.21153 \times 10^{-10}$ |
| 8 | -0.26256 | $-6.61141 \times 10^{-6}$ | $8.35925 \times 10^{-7}$ | $-9.13114 \times 10^{-9}$ | $-9.29535 \times 10^{-11}$ |
| 9 | 0.00110 | $2.02535 \times 10^{-4}$ | $-3.42307 \times 10^{-7}$ | $4.36413 \times 10^{-9}$ | $7.26187 \times 10^{-12}$ |
| 12 | 0.10663 | $4.93598 \times 10^{-6}$ | $1.22683 \times 10^{-6}$ | $-6.48252 \times 10^{-9}$ | $-1.04199 \times 10^{-10}$ |

Figure 2A:
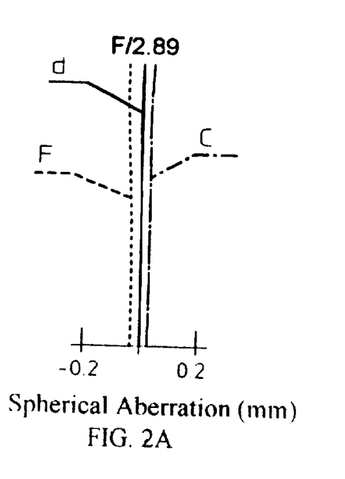
FIGS. 2A–2F show aberrations of the zoom lens according to Embodiment 1 of the invention at the wide-angle and telephoto ends.
Figure 2B:
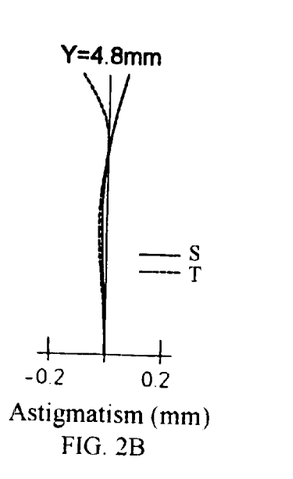
Figure 2C:
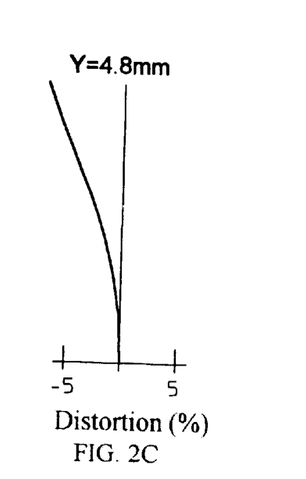
Figure 2D:
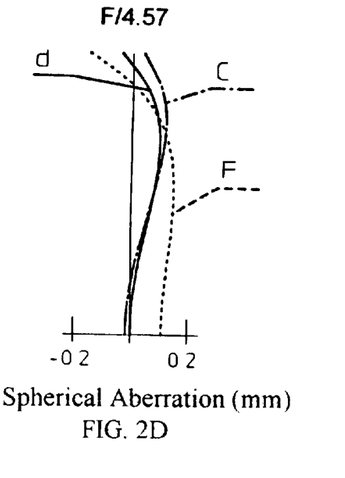
Figure 2E:
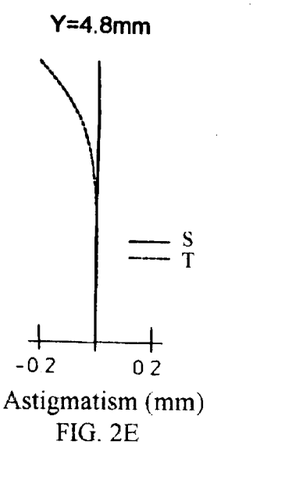
Figure 2F:
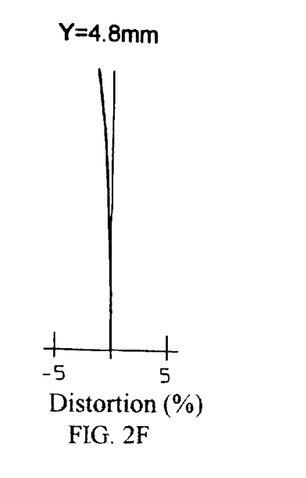

FIGS. 2A–2C show the spherical aberration, astigmatism, and distortion at the wide-angle end of the zoom lens of Embodiment 1. FIGS. 2D–2F show the spherical aberration, astigmatism, and distortion at the telephoto end of the zoom lens of Embodiment 1. Each spherical aberration graph lists the aberration for the C, d, and F lines. Each astigmatic aberration graph includes the aberration curves in both the sagittal S and tangential T image planes. As is apparent from FIGS. 2A–2F, the zoom lens of Embodiment 1 favorably corrects aberrations over the entire range of zoom. Further, as will be shown in detail later, this embodiment satisfies each of Conditions (1)–(8).

Embodiment 2

The three group zoom lens of Embodiment 2 has nearly the same configuration as that of Embodiment 1 except the first lens element of the first lens group is planar near the optical axis on its object side, and different lens surfaces in this embodiment are made to be aspherical.

Table 4 below lists the surface number #, in order from the object side, the radius of curvature R (in mm) of each surface near the optical axis, the on-axis surface spacing D (in m), as well as the refractive index $N_d$ and the Abbe number $v_d$ (at the d line) of each lens element for this embodiment. The bottom portion of Table 4 lists the range of the focal length, the range of the $F_{NO}$, and the picture angle $2\omega$ for this embodiment.

TABLE 4

| # | R | D | $N_d$ | $v_d$ |
|---|---|---|---|---|
| 1* | ∞ | 1.50 | 1.80610 | 40.7 |
| 2 | 8.631 | 2.31 | | |
| 3* | 8.853 | 2.41 | 1.80517 | 25.4 |
| 4 | 13.838 | D4 (variable) | | |
| 5 | ∞ (stop) | 0.80 | | |
| 6* | 12.412 | 2.66 | 1.49700 | 81.6 |
| 7 | -26.433 | 0.15 | | |
| 8* | 8.921 | 2.55 | 1.49700 | 81.6 |
| 9 | 178.828 | 3.03 | | |
| 10 | 17.192 | 0.70 | 1.84665 | 23.8 |
| 11 | 5.308 | D11 (variable) | | |
| 12* | 12.835 | 2.06 | 1.68893 | 31.1 |
| 13 | 42.641 | D13 (variable) | | |

TABLE 4-continued

| # | R | D | $N_d$ | $v_d$ |
|---|---|---|---|---|
| 14 | ∞ | 2.00 | 1.51680 | 64.2 |
| 15 | ∞ | | | |
| f = 8.70–24.37 | | $F_{NO}$ = 2.89–4.49 | | $2\omega$ = 61.4°–22.6° |

Table 5 below lists the values of the variables D4, D11 and D13 (i.e, the group spacings) at both the wide-angle end (WIDE) to the telephoto end (TELE) when focused for an object at infinity and nearby. Again, the term "nearby object" refers to an object that is 0.2 m from the image plane 1.

TABLE 5

| | Object at Infinity | | Nearby Object | |
|---|---|---|---|---|
| | WIDE | TELE | WIDE | TELE |
| D4 | 22.96 | 2.37 | 22.96 | 2.37 |
| D11 | 5.89 | 5.89 | 5.12 | 2.64 |
| D13 | 2.00 | 13.91 | 2.77 | 17.16 |

Table 6 below lists the values of the constants K, $A_4$, $A_6$, $A_8$, and $A_{10}$ used in Equation (A) above for each of the aspherical surfaces indicated in Table 4.

TABLE 6

| # | K | $A_4$ | $A_6$ | $A_8$ | $A_{10}$ |
|---|---|---|---|---|---|
| 1 | 0.00000 | $1.54229 \times 10^{-4}$ | $-2.13864 \times 10^{-6}$ | $3.03560 \times 10^{-8}$ | $-1.66397 \times 10^{-10}$ |
| 3 | -0.49162 | $-7.01495 \times 10^{-5}$ | $1.30772 \times 10^{-6}$ | $-1.96926 \times 10^{-8}$ | $1.29883 \times 10^{-10}$ |
| 6 | -0.31059 | $-3.46405 \times 10^{-6}$ | $-3.31471 \times 10^{-6}$ | $5.35894 \times 10^{-8}$ | $6.21595 \times 10^{-10}$ |
| 8 | -1.79783 | $1.50369 \times 10^{-4}$ | $3.64302 \times 10^{-6}$ | $-1.23242 \times 10^{-7}$ | $-6.40109 \times 10^{-10}$ |
| 12 | 0.12787 | $1.49907 \times 10^{-5}$ | $2.15949 \times 10^{-6}$ | $-3.25275 \times 10^{-8}$ | $-2.25635 \times 10^{-10}$ |

Figure 3A:
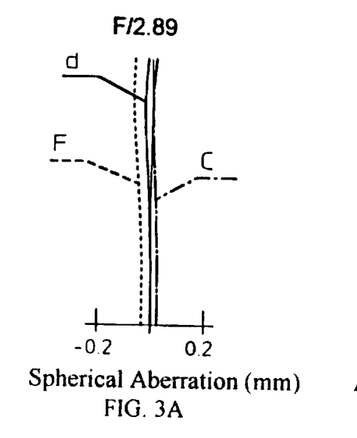
FIGS. 3A–3F show aberrations of the zoom lens according to Embodiment 2 of the invention at the wide-angle and telephoto ends.
Figure 3B:
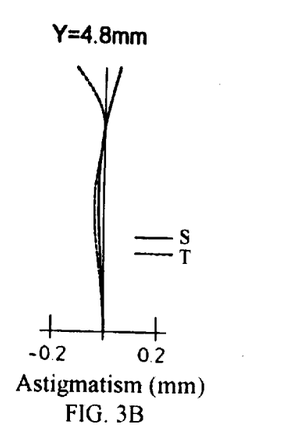
Figure 3C:
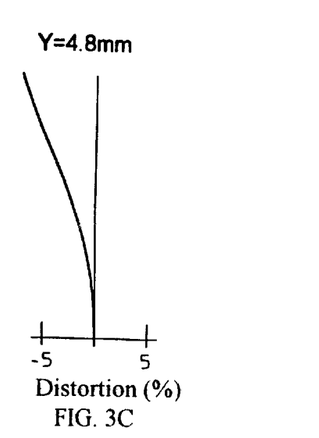
Figure 3D:
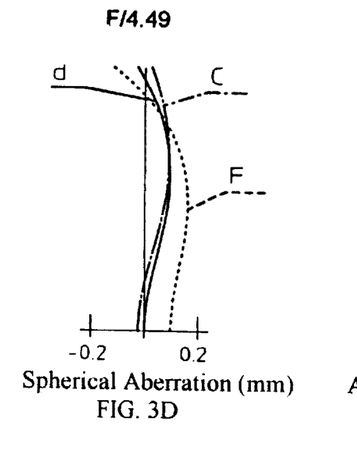
Figure 3E:
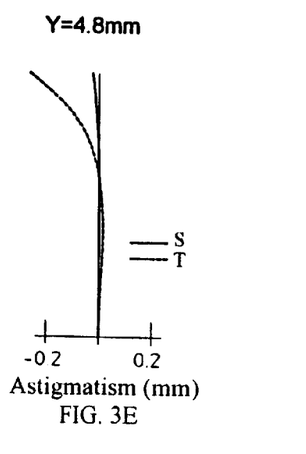
Figure 3F:
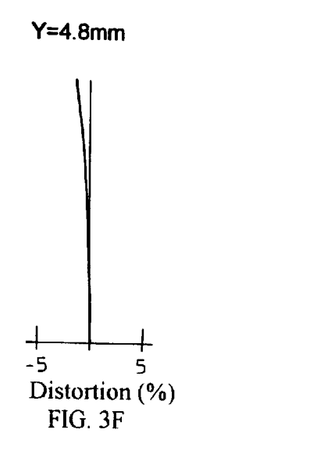

FIGS. 3A–3C show the spherical aberration, astigmatism, and distortion at the wide-angle end of the zoom lens of Embodiment 2. FIGS. 3D–3F show the spherical aberration, astigmatism, and distortion at the telephoto end of the zoom lens of Embodiment 2. Each spherical aberration graph lists the aberration for the C, d, and F lines. Each astigmatic aberration graph includes the aberration curves in both the sagittal S and tangential T image planes. As is apparent from FIGS. 3A–3F, the zoom lens of Embodiment 2 favorably corrects aberrations over the entire range of zoom. Further, as shown below, this embodiment also satisfies each of the above Conditions (1) to (8).

Table 7 below lists, for Embodiments 1 and 2, the values determined in Conditions (1)–(8).

TABLE 7

| | Embodiment 1 | Embodiment 2 |
|---|---|---|
| Condition (1) | 0.47 | 0.45 |
| Condition (2) | 1.33 | 1.27 |
| Condition (3) | 0.49 | 0.56 |
| Condition (4) | 0.23 | 0.23 |
| Condition (5) | 75.9 | 81.6 |
| Condition (6) | 1.81 | 1.81 |
| Condition (7) | 16.9 | 15.3 |
| Condition (8) | 3.75 | 4.55 |

As is described above, the three-group zoom lens according to the present invention allows the incorporation of a rear focusing system, with the exit pupil being appropriately distant from the image plane for efficient light detection because the distance between the second and third lens groups is nearly fixed during magnification change when the zoom lens is in focus at is infinity. In addition, the three-group zoom lens according to the present invention ensures compactness and favorably corrects for aberrations due to the first lens group having a negative lens element and a positive lens element and each of the first, second, and third lens groups having at least one surface that is aspherical. Furthermore, since all the lens groups are movable, in the present invention it is relatively easy to add a body pull-back mechanism in order to further shorten the overall length of the zoom lens.

The invention being thus described, it will be obvious that the same may be varied in many ways. For example, the number and shape of the lens elements comprising each lens group can be modified. Such variations are not to be regarded as a departure from the spirit and scope of the invention. Rather the scope of the invention shall be defined as set forth in the following claims and their legal equivalents. All such modifications as would be obvious to one skilled in the art are intended to be included within the scope of the following claims.

What is claimed is:

1. A three-group zoom lens comprising, in the order from the object side:
    a first lens group having negative refractive power which consists of a negative lens element nearest the object side and a positive lens element nearest the image side;
    second lens group having positive refractive power that includes, in order from the object side, a stop for controlling the brightness of an image, two positive lens elements, and a negative lens element; and
    a third lens group having positive refractive power; wherein
    each of the first, second and third lens groups includes at least one aspherical surface;
    when zooming from the wide-angle end to the telephoto end, the first lens group is moved nearer the second lens group, and the second and third lens groups are each moved toward the object side;
    when focusing from an object at infinity to a nearby object, the third lens group is moved toward the object side;
    the third lens group includes a positive meniscus lens element having surfaces of different radii of curvature, with the surface of smaller radius of curvature being convex and on the object side; and
    the negative lens element in the first lens group and at least one of the positive lens elements in the second lens group each include an aspherical surface.

2. The zoom lens of claim 1, wherein the following condition is satisfied:

$$0.3 < f_W/|f_1| < 0.6$$

where
    $f_W$ is the focal length of the zoom lens at the wide-angle end,
    $f_1$ is the focal length of the first lens group.

3. The zoom lens of claim 1, wherein the following condition is satisfied:

$$1.1 < f_T/|f_1| < 1.6$$

where
    $f_T$ is the focal length of the zoom lens at the telephoto end, and
    $f_1$ is the focal length of the first lens group.

4. The zoom lens of claim 1, wherein the following condition is satisfied:

$$0.4 < f_2/f_3 < 0.8$$

where
    $f_2$ is the focal length of the second lens group, and
    $f_3$ is the focal length of the third lens group.

5. The zoom lens of claim 1, wherein the following condition is satisfied:

$$0.15 < D_{2W}/f_3 < 0.3$$

where
    $D_{2W}$ is the distance, at the wide-angle end when the zoom lens is focused on an object at infinity, between the surface of the second lens group that is nearest the image and the surface of the third lens group that is nearest the object, and
    $f_3$ is the focal length of the third lens group.

6. A three-group zoom lens comprising, in the order from the object side:
    a first lens group having negative refractive power which includes a negative lens element and a positive lens element;
    a second lens group having positive refractive power that includes a stop for controlling the brightness of an image, two positive lens elements, and a negative lens element; and
    a third lens group having positive refractive power; wherein
    each of the first, second and third lens groups includes at least one aspherical surface;
    when zooming from the wide-angle end to the telephoto end, the first lens group is moved nearer the second lens group, and the second and third lens groups are each moved toward the object side; and
    when focusing from an object at infinity to a nearby object, the third lens group is moved toward the object side;
    wherein the following condition is satisfied:

$$\nu_{2p} < 68$$

where
    $\nu_{2p}$ is the average of the Abbe numbers of the positive lens elements in the second lens group.

7. The three-group zoom lens of claim 1, wherein the negative lens element in the first lens group has surfaces of different radii of curvature, with the surface of smaller radius of curvature being concave and on the image side, and the positive lens element in the first lens group is a meniscus lens with its convex surface on the object side.

8. The three-group zoom lens of claim 1, wherein:
the two positive lens elements in the second lens group are, in order from the object side, a biconvex lens element, and a lens element having surfaces of different radii of curvature, with the surface of smaller radius of curvature on the object side; and,
the negative lens element in the second lens group has surfaces of different radii of curvature, with the surface of smaller radius of curvature being concave and on the image side.

9. The zoom lens of claim 1, wherein the following condition is satisfied:

$$N_{1n} < 1.72$$

where $N_{1n}$ is the refractive index of the negative lens element in the first lens group.

10. The zoom lens of claim 1, wherein the following condition is satisfied:

$$\nu_{1n} - \nu_{1p} > 11$$

where
$\nu_{1n}$ is the Abbe number of the negative lens element in the first lens group, and
$\nu_{1p}$ is the Abbe number of the positive lens element in the first lens group.

11. A three-group zoom lens comprising, in the order from the object side:
a first lens group having negative refractive power which includes a negative lens element and a positive lens element;
a second lens group having positive refractive power that includes a stop for controlling the brightness of an image, two positive lens elements, and a negative lens element; and
a third lens group having positive refractive power; wherein
each of the first, second and third lens groups includes at least one aspherical surface;
when zooming from the wide-angle end to the telephoto end, the first lens group is moved nearer the second lens group, and the second and third lens groups are each moved continuously toward the object side;
when focusing from an object at infinity to a nearby object, the third lens group is moved toward the object side;
the third lens group includes a positive lens element having surfaces of different radii of curvature, with the surface of smaller radius of curvature being convex and on the object side;
the negative lens element in the first lens group and at least one of the positive lens elements in the second lens group each include an aspherical surface; and the following condition is satisfied:

$$2.5 < (R_4 + R_3)/(R_4 - R_3) < 6$$

where
$R_3$ is the radius of curvature of the object-side surface of the positive lens element in the first lens group, and
$R_4$ is the radius of curvature of the image-side surface of the positive lens element in the first lens group.

* * * * *

UNITED STATES PATENT AND TRADEMARK OFFICE
CERTIFICATE OF CORRECTION

PATENT NO. : 6,611,386 B2
DATED : August 26, 2003
INVENTOR(S) : Tanaka

It is certified that error appears in the above-identified patent and that said Letters Patent is hereby corrected as shown below:

<u>Title page,</u>
Item [57], ABSTRACT,
Line 16, change "$F_{NO}$" to -- $F_{NO}$ --;

<u>Column 1,</u>
Line 54, delete the comma after "the";

<u>Column 6,</u>
Line 11, change "$F_{NO}$" to -- $F_{NO}$ --;
Line 36, change to:
-- $Z = CY^2 / \{1 + (1 - (1+K)C^2Y^2)^{1/2}\} + A_4Y^4 + A_6Y^6 + A_8Y^8 + A_{10}Y^{10}$    ...(Equation A) --
Line 52, change "to the telephoto end" to -- and the telephoto end --;

<u>Column 7,</u>
Line 39, change "$F_{NO}$" to -- $F_{NO}$ --;

<u>Column 8,</u>
Line 23, change "to the telephoto end" to -- and the telephoto end --;

<u>Column 9,</u>
Line 34, change "Rather" to -- Rather, --.

Signed and Sealed this

Eighteenth Day of November, 2003

JAMES E. ROGAN
*Director of the United States Patent and Trademark Office*